United States Patent
Bracco et al.

(10) Patent No.: US 7,955,633 B2
(45) Date of Patent: Jun. 7, 2011

(54) EDIBLE OIL COMPOSITION, PARTICULARLY FOR USE IN FRYING AND COOKING FOODS

(75) Inventors: Umberto Bracco, Vevey (CH); Mauro Leonardi, Acquasparta (IT); Giovanni Morchio, Imperia (IT)

(73) Assignee: Costa D'Oro S.p.A., Perugia (IT)

( * ) Notice: Subject to any disclaimer, the term of this patent is extended or adjusted under 35 U.S.C. 154(b) by 625 days.

(21) Appl. No.: 12/091,593

(22) PCT Filed: Oct. 24, 2006

(86) PCT No.: PCT/IB2006/053912
§ 371 (c)(1),
(2), (4) Date: Apr. 25, 2008

(87) PCT Pub. No.: WO2007/049227
PCT Pub. Date: May 3, 2007

(65) Prior Publication Data
US 2008/0280002 A1  Nov. 13, 2008

(30) Foreign Application Priority Data
Oct. 26, 2005  (IT) .............................. TO2005A0755

(51) Int. Cl.
*A23D 9/00* (2006.01)
(52) U.S. Cl. ...................................... 426/601; 426/541
(58) Field of Classification Search .................. 426/601, 426/541, 607
See application file for complete search history.

(56) References Cited

U.S. PATENT DOCUMENTS

| | | | |
|---|---|---|---|
| 5,518,753 A | 5/1996 | Bracco et al. | |
| 5,843,497 A | 12/1998 | Sundram et al. | |
| 6,034,130 A | 3/2000 | Wang et al. | |
| 6,159,524 A * | 12/2000 | Livingston | .................... 426/603 |

FOREIGN PATENT DOCUMENTS

| | | |
|---|---|---|
| EP | 0893064 | 1/1999 |
| EP | 0937408 | 8/1999 |
| WO | 01/72136 | 10/2001 |
| WO | 03/056939 | 7/2003 |

OTHER PUBLICATIONS

Paganuzzi, V. 1979. JAOCS 56:925.*
Papadopoulos, G. et al. 1991. JAOCS 68(9)669.*
Boskou, D. 1983. JAOCS 60(8)1517.*
Swern, D, (editor). 1979. Bailey's Industrial Oil and Fat Products, vol. 1, 4$^{th}$ edition, John Wiley & Sons, New York, p. 370, 416, 430.*
PCT International Search Report for PCT/IB2006/053912 filed on Oct. 24, 2006 in the name of Costa D'Oro S.p.A. et al.
PCT Written Opinion for PCT/IB2006/053912 filed on Oct. 26, 2006 in the name of Umberto Bracco, et al.
PCT International Preliminary Report on Patentability for PCT/IB2006/053912 filed on Oct. 26, 2006 in the name of Umberto Bracco, et al.

* cited by examiner

*Primary Examiner* — Carolyn A Paden
(74) *Attorney, Agent, or Firm* — Steinfl & Bruno LLP

(57) ABSTRACT

There is disclosed an edible oil composition, particularly for use in frying and cooking foods, which has a high stability under thermal stress, with less development of degradation products during frying and cooking and less absorption of these degradation products on the surface of the food. The composition consists of a mixture of vegetable oils characterized by a ratio by weight (R) of monounsaturated fatty acids to polyunsaturated fatty acids in the range from 5 to 8, a percentage by weight of saturated fatty acids (S) in the range from 18 to 22%, and a content of antioxidants in the range from 50 to 500 ppm. Advantageously, these antioxidants are produced by molecular distillation from natural lipid starting materials.

10 Claims, 2 Drawing Sheets

EDIBLE OIL COMPOSITION, PARTICULARLY FOR USE IN FRYING AND COOKING FOODS

CROSS REFERENCE TO RELATED APPLICATIONS

This application is the national phase of International Application PCT/IB2006/053912 filed on Oct. 24, 2006 which, in turn, claims priority to Italian Patent Application TO2005A000755 filed on Oct. 26, 2005.

BACKGROUND OF THE INVENTION

The invention relates to an edible oil composition, particularly for use in frying and cooking foods.

The frying process is essentially an operation, of dehydrating the food in a bath of oil at a temperature of 150° C.-200° C. This is a rather complex process, in which two phenomena, namely mass transfer and thermal energy transfer between the components of the food and the oil, take place simultaneously.

The mass transfer consists of the radial migration of the water contained in the inner parts of the food towards the outer surfaces, to replace the water which is eliminated by evaporation from the oil/product interface, this evaporation being due to the rapid increase in the surface temperature of the product which occurs during the frying process. The water migration phenomenon is known as "pumping", by analogy with the operation of a virtual machine which draws the water from the inside and transfers it to the outer parts of the product.

In the thermal energy transfer, the surface temperature of the product rises, approaching the oil temperature (approximately 180° C.), while the internal temperature of the food tends to increase slowly to levels close to the boiling point of water. Thus the aforesaid migration of water towards the outside of the product also has the function of removing the thermal energy accumulated in the product by the oil at high temperature, and the change of phase from water to vapour prevents undesirable phenomena of carbonization of the product due to excessive dehydration.

The water present within the food product also acts as a solvent of its constituents (such as amides and proteins) and participates in reactions which affect its structure (gelification of the amides) and its organoleptic characteristics (protein denaturation, formation of aromatic and coloured substances).

This activity of the water during frying depends on the effectiveness of the heat exchange between the energy vehicle, namely the frying oil, and the various hydrophilic phases present in the product.

The oil is therefore the most critical and variable component in the frying operation, not only because of its well-known instability under thermal stress, with the formation of degradation products, but also because of the physico-chemical impact which conditions the frying operations and the characteristics of the fried product.

At the high temperatures used during frying, the oil can undergo hydrolytic splitting, with the formation of partial glycerides and free fatty acids and a decrease of the smoke point; oxidation, with the formation of hydroperoxides which subsequently evolve with related cycling and rheological changes (with a negative effect on the viscosity of the oil); formation of splitting compounds such as polar compounds, compounds with a carbonyl and furan structure (responsible for the off-flavour); and formation of position isomers (conjugate acids) and structure isomers (trans acids) with suspected anti-nutritional activity.

The frying cycle therefore causes an increase in the polarity of the water/oil system due to the reactivity of the oil used, with a negative effect on the physico-chemical and rheological characteristics of the product, combined with potential undesirable biological effects in the metabolic phase, such as the decrease of the nutritional value of the product and possible interference with endogenous enzyme activity during digestion and transport.

The above discussion demonstrates the need to provide oil compounds for frying and cooking which have a high stability under thermal stress, with less development of degradation products during frying and/or cooking and less absorption of these degradation products on the surface of the food.

SUMMARY OF THE INVENTION

The inventors have conducted trials which enabled them to identify some basic criteria for the preparation of vegetable oil mixtures in order to obtain edible oil compositions, particularly for frying and cooking food, which meet the aforementioned requirements.

These criteria are, in particular:
(i) the substantial absence of medium- and short-chain fatty acids ($C \leq 12$), in order to avoid rapid hydrolytic splitting of the triglycerides with formation of free fatty acids and polar compounds and consequent lowering of the smoke point; in this context, the expression "substantial absence" used above signifies a content of medium- and short-chain fatty acids ($C \leq 12$) of less than 0.5% by weight of the total fatty acid content;
(ii) a balance in the mixture of oils, on the one hand between the monounsaturated fatty acids and the polyunsaturated fatty acids, and on the other hand in the relative content of saturated fatty acids, in order to promote the oxidation stability of the oil while also controlling its rheological characteristics (particularly the dynamic viscosity and the specific density);
(iii) the presence in the oil mixture of an adequate quantity of antioxidant substances of natural origin, stable at the process temperature, which have potential synergic interactions without effects on the organoleptic qualities of the finished product.

DETAILED DESCRIPTION OF THE INVENTION

Figure 1:
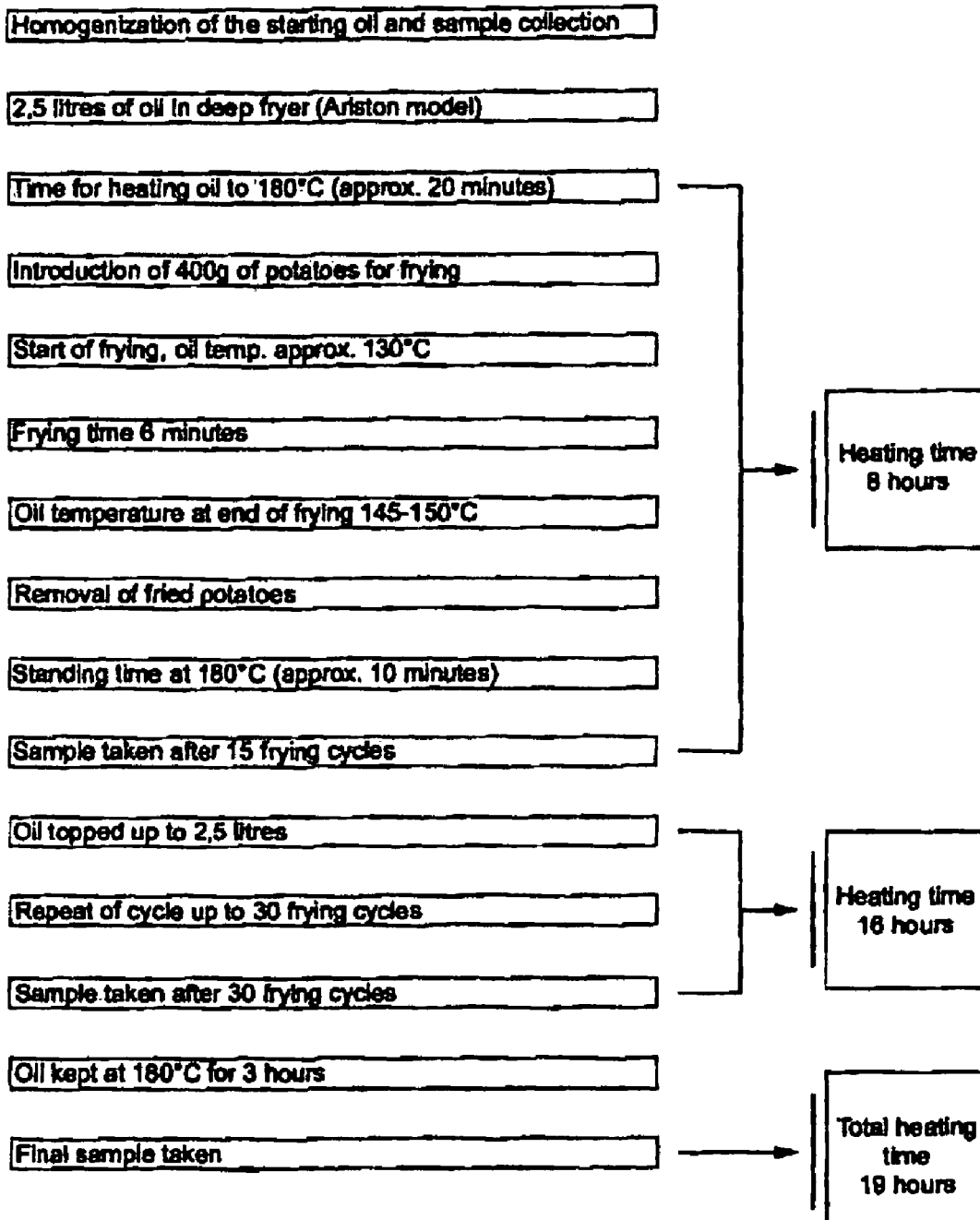
FIG. 1 shows a diagram illustrating a frying and sampling procedure for a deep frying mixture.

The relationship between monounsaturated fatty acids and polyunsaturated fatty acids indicated at (ii) was defined by means of the ratio by weight R=content of monounsaturated fatty acids/content of polyunsaturated fatty acids.

The relative content of saturated fatty acids is defined as the percentage S=percentage by weight of saturated fatty acids with respect to the total weight of fatty acids.

The inventors have found that the values of R and S are the key parameters of the system, since they can be used to modify the physico-chemical characteristics of the oil mixtures, for example their dynamic viscosity, measured as the capillary flow time in seconds at a constant temperature (20°

C.) and with a constant path (200 ml), and have a direct relationship with the rate of absorption of the oil in the fried product.

The invention therefore relates to an edible oil composition, particularly for use in frying and cooking foods, the said composition consisting of a mixture of vegetable oils characterized by a ratio by weight of monounsaturated fatty acids to polyunsaturated fatty acids (R) in the range from 5 to 8, and preferably from 6 to 7, a percentage of saturated fatty acids (S) in the range from 18% to 22%, preferably 19% to 21%, and a content of antioxidant substances in the range from 50 to 500 ppm, preferably 200 to 300 ppm.

Compositions having the characteristics specified above can be produced by mixing different vegetable oils, taking into account the known content of saturated and unsaturated (mono- and polyunsaturated) fatty acids of each oil in the mixture.

The possibility of varying the vegetable oil composition of the mixture, while remaining within the ranges stated above in relation to the values of R and S, is an advantageous aspect of the invention, since it permits a degree of flexibility of production in respect of cost, availability and planning.

The inventors have found that the preferred edible oil compositions according to the invention have the following composition in terms of the types of oil used:

Fraction A=monounsaturated oil+polyunsaturated oil fraction: from 20 to 80% by weight, preferably from 40 to 60%;

Fraction B=saturated oil fraction: from 10 to 50% by weight, preferably from 15 to 30%.

In the present description, monounsaturated oils are considered to be oils with a high oleic acid content or with an oleic/polyunsaturated acid ratio greater than 2, such as oils from fruit pulps (olive, avocado, liquid fractions of palm oil), seeds (sunflower and high-oleic safflower, canola), nuts (almond, hazel nut, pecan, pistachio, cashew, macadamia), and fruit stones (apricot, papaya, guava).

Polyunsaturates are considered to be oils with a high content of linoleic acid ($\geq$50% of the total fatty acids) such as maize, cotton, sunflower, grape seed, soya, safflower, and nuts, while sesame, peanut and rice oil form intermediate mono- and polyunsaturated compounds.

Saturated oils are considered to be oils with a saturated fatty acid content, in excess of 40% of the total fatty acid content, for example, fractions of palm, animal fats (lard, tallow), cocoa butter, illipe and karite.

As mentioned above, an important characteristic for the oil compositions according to the invention is the content of antioxidant substances, which should be in the range from 50 to 500 ppm, preferably from 200 to 300 ppm.

These antioxidant substances can be of natural or synthetic origin, such as ascorbyl palmitate (E304) and the gallate series (E310-311-312).

In the compositions according to the invention it is preferable to use antioxidant substances of natural origin, preferably produced by molecular distillation of initial lipid materials rich in antioxidant substances, such as unrefined oils and natural lipid extracts. Molecular distillation is; a method known per se for concentrating the antioxidants present in the initial lipid material, based on the separation of different molecular masses, where the antioxidant concentrate with low molecular weight (M<500) is separated by high-vacuum molecular distillation from its solvent (triglycerides) with high molecular weight (M$\geq$900).

Molecular distillation can be carried out by a two-stage process in a Leybold DK 10 molecular distillation unit. This process requires a preliminary purification of the initial lipid material (unrefined oils, distillates from the deodorizing of oils, natural lipid extracts and/or other natural components rich in antioxidants) at 40-60° C. with slightly alkaline solutions (for example $Na_2CO_3$ 300-500 mg/kg). The first stage of the molecular distillation (the stage of deaeration and dehydration of the initial lipid material) is carried out by means of a first separating column provided with a cooling system which operates under a vacuum of 3-5 mm/Hg at a temperature of 40°-70° C. The second stage of the process is carried out by means of a second separating column provided with a cooling system operating at high vacuum (0.001-0.005 mm/Hg) and at a temperature of 140° C.-180° C., with column transit times of approximately 15-30 seconds. The separating column with a cooling system can be used to separate the triglyceride medium from the components with low molecular weight, because of the different molecular paths of the molecules with different weights.

The process can be used to obtain a lipid fraction with a high antioxidant loading (in other words, with a high concentration of antioxidant molecules) which can be evaluated by known methods (for example, ORAC, Oxygen Radical Absorbing Capacity), in order to standardize its activity, for example. The lipid fraction with a high antioxidant loading produced by molecular distillation from initial lipid materials is referred to in the present description as the "antioxidant lipid fraction".

Preferably, in the edible oil compound according to the invention the antioxidant lipid fraction (Fraction C) is present in a quantity from 2 to 10% by weight, preferably from 1 to 3% by weight.

By using this antioxidant lipid fraction it is possible to overcome some drawbacks of conventional antioxidants, whether synthetic or non-synthetic, primarily their volatility at the temperature of the frying and cooking process. This is the case, for example, with terpene molecules present in essential oils produced from herbs (for example, borneol from rosemary, thujone from sage, thymol from thyme, etc.) and with low-boiling point phenolic molecules (BHA, BHT).

Other commonly used antioxidants are oleoresins extracted with organic solvents from aromatic herbs, for example those of the Lamiaceae family (oregano, thyme, marjoram), and oils such as partially refined sesame, rice and palm oils which in their unrefined state contain phenol, furan, lignan, and sterol groups and derivatives such as side-chain sterols with an ethylidene structure with an anti-polymerizing action which protects the oil at high temperatures. However, these antioxidants also have various drawbacks. Oleoresins have an effect on the organoleptic characteristics of frying oil, particularly on the colour and odour; oils from refined seeds (sesame, rice, palm) do not have a completely neutral flavour and their content in natural antioxidants is subject to variations which may be natural or may be due to the technology used.

These drawbacks are overcome by using the antioxidant lipid fraction which can be produced by molecular distillation as described above, has no effect on the organoleptic characteristics of the product, is stable at the temperatures used during frying, and can be standardized in respect of the antioxidant activity.

The following examples are provided for illustration only and are not intended to limit the scope of the invention as defined in the attached claims.

EXAMPLE 1

A mixture of Fraction A (pomace olive oil/high-oleic sunflower, 50%/17%), Fraction B (double-fractionated palm oil, 30%) Fraction C (antioxidant lipid fraction, 3%) has the values R=6.05 and S=20.92 with a dynamic viscosity of 1.10.

Figure 2:
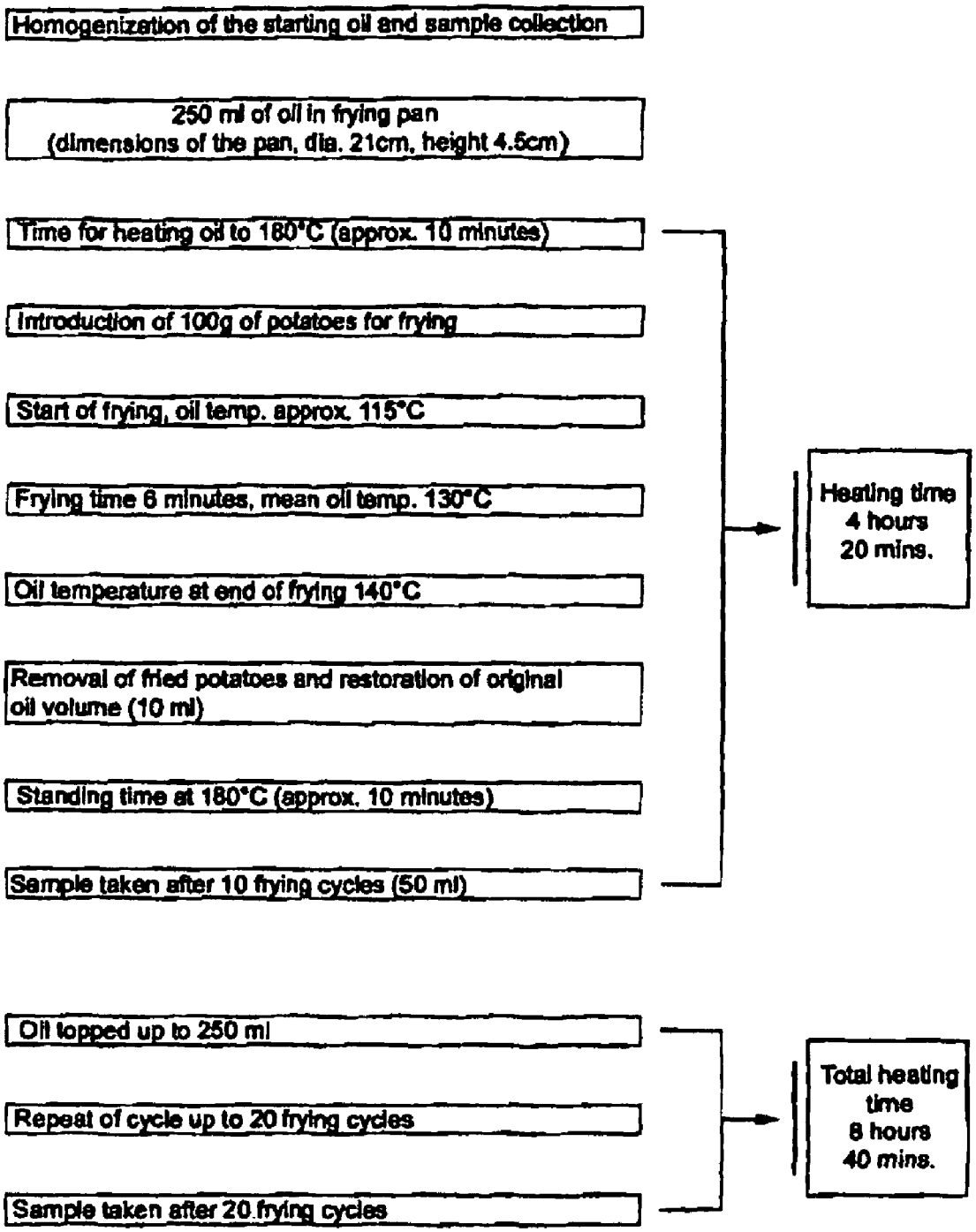
FIG. 2 shows a diagram illustrating a frying and sampling procedure for a deep frying mixture.

This mixture was used for deep frying and pan frying tests with fresh potato chips, by comparison with a market-leading product with the values R=3.35 and S=39.24. The comparative frying test procedures are shown in the diagrams in FIGS. 1 and 2, respectively. The total numbers of cycles were 15 and 30 for deep frying and 10 and 20 for the pan frying process.

In both tests, the results showed a reduced formation of oil degradation compounds and less modification of the quality parameters (acidity, spectrophotometry) and purity (acid and triglyceride compounds) with the mixture according to the invention, by comparison with the control.

The level of polar compounds, as a global indicator of the newly formed structures in thermal processing, was 7.6% and 10.8% after 15 and 30 cycles of deep frying respectively, with the mixture according to the invention, as compared with 21.1% and 29.8% for the control.

Even more significant differences for the aforementioned analytes are, found in the pan frying process. In this case, the level of, polar compounds after 10 and 20 cycles was 13.5% and 22.0% with the mixture according to the invention, while the corresponding values in the control oil were 29.4% and 31.8%.

EXAMPLE 2

Two mixtures were formulated, one with R=7.62 and S=17.61 (Mixture 1) and the other with R=7.65 and S=17.52 (Mixture 2), by exchanges between oils having the same monounsaturated/polyunsaturated ratio, while maintaining relatively constant levels of saturated and antioxidant complexes.

Continuous frying tests were conducted with fryers having a capacity of 50 liters of oil, using as the control an oil widely used in industry, with R=0.735 and S=10.33. The operation consisted of continuously frying fish, coated with flour, repeated on two successive days of operation in the same working conditions. The results given in Table 1 show that the formulated mixtures had a good resistance to heat and oxidation, reducing the amounts of oxidation products and degradation products (polar compounds), which were 30% of the total for the control oil. The rate of absorption of the oil on the surface of the fried product (measured by cold extraction with bipolar solvents) and its peroxidation were also lower in both mixtures than in the control.

The combination of fewer polar compounds in the oil during frying and less oil absorbed on the finished product, achieved with the mixtures according to the invention by comparison with the control oil, caused a reduction of approximately 40-50%, of polar compounds in the finished product. This is of considerable significance for health, in view of the suspected anti-nutritional activity of the thermal degradation products.

EXAMPLE 3

Frying tests were conducted in the laboratory to compare the mixtures of Example 2 with certain commonly used vegetable oils, used in the form of mono oils (not in mixtures) such as peanut oil, high-oleic sunflower oil, sesame oil and a binary palm/sunflower mixture marketed at the present time. The frying conditions were as described above. The results confirm those obtained previously. Table 2 shows some of these results, which confirm the lower degradation and the lower accumulation of the products formed in the fried product.

TABLE 1

Comparative results of frying with mixtures 1 and 2 and with a control oil, after 2 × 6 hours of continuous frying

|  | Sunflower R = 0.735 S = 10.33 | Mixture 1 R = 7.62 S = 17.61 | Mixture 2 R = 7.65 S = 17.52 |
|---|---|---|---|
| Acidity % | 0.31 | 0.26 | 0.27 |
| Peroxides | 7.8 | 3.7 | 4.0 |
| Polar compounds % | 10.7 | 7.9 | 9.3 |
| Oil absorbed by potatoes % | 9.3 | 8.9 | 8.2 |
| Polar compounds on the absorbed oil % | 14.4 | 8.5 | 9.7 |
| Polar compounds on the product % | 1.40 | 0.75 | 0.79 |

TABLE 2

Comparative results of frying with mixtures 1 and 2 and commercial oils currently in use, after 30 hours of continuous frying

|  | Sunflower R = 0.735 S = 10.33 | Peanut R = 2.38 S = 19.61 | Sesame R = 1.10 S = 17.63 | Palm + Sunflower R = 0.85 S = 26.80 | Mixture 1 R = 7.62 S = 17.61 | Mixture 2 R = 7.65 S = 17.52 |
|---|---|---|---|---|---|---|
| Acidity (%) | 0.40 | 0.38 | 0.42 | 0.35 | 0.35 | 0.38 |
| Peroxides meq O$_2$/kg | 7.5 | 8.40 | 8.30 | 7.40 | 5.60 | 5.70 |
| Polar compounds (%) | 29.5 | 28.2 | 30.10 | 29.30 | 26.1 | 25.6 |
| Oil absorbed by the potatoes (%) | 13.2 | 11.7 | 10.20 | 8.60 | 7.50 | 7.70 |
| Polar Cs on the product (%) | 3.90 | 3.29 | 3.07 | 2.51 | 1.95 | 1.97 |

The invention claimed is:

1. An edible oil composition consisting of a mixture of vegetable oils, the mixture of vegetable oils comprising monounsaturated fatty acids, polyunsaturated fatty acids, saturated fatty acids and antioxidants, with a ratio by weight (R) of monounsaturated fatty acids to polyunsaturated fatty acids in a range from 5 to 8, a percentage by weight of saturated fatty acids (S) in a range from 18 to 22%, and a content of antioxidants in a range from 50 to 500 ppm.

2. The edible oil composition according to claim 1, wherein the ratio by weight (R) of monounsaturated fatty acids to polyunsaturated fatty acids is in a range from 6 to 7.

3. The edible oil composition according to claim 1, wherein the percentage by weight of saturated fatty acids (S) is in a range from 19 to 21%.

4. The edible oil composition according to claim 1, wherein the content of antioxidants is in a range from 200 to 300 ppm.

5. The edible oil composition according to claim 1, wherein the antioxidants comprise an antioxidant lipid fraction, and the composition comprises:
   from 20 to 80% of monounsaturated and polyunsaturated fatty acids;
   from 10 to 50% of saturated fatty acids;
   from 2 to 10% of the antioxidant lipid fraction.

6. The edible oil composition according to claim 5, comprising:
   from 40 to 60% of monounsaturated and polyunsaturated fatty acids;
   from 15 to 30% of saturated fatty acids;
   from 1 to 3% of the antioxidant lipid fraction.

7. The edible oil composition according to claim 1, wherein the antioxidants are obtainable by organic synthesis, extraction with solvents having different polarity or by molecular distillation of natural lipid starting materials.

8. The edible oil composition according to claim 7, wherein the natural lipid starting materials are unrefined oils, distillates obtained from the deodorization of oils, and/or natural lipid extracts.

9. The composition according to claim 1, wherein said composition is suitable for frying or cooking foods.

10. A method for frying or cooking food, the method comprising frying or cooking the food with the edible oil composition according to claim 9.

* * * * *